(12) United States Patent
Doyle et al.

(10) Patent No.: US 12,019,757 B2
(45) Date of Patent: *Jun. 25, 2024

(54) THREAT SCORE PREDICTION MODEL

(71) Applicant: Tenable, Inc., Columbia, MD (US)

(72) Inventors: Bryan Peter Doyle, Kilmacanogue (IE); Vincent Gilcreest, Leopardstown (IE); Wei Tai, Dundrum (IE); Damien McParland, Louth (IE); Renaud Deraison, New York, NY (US)

(73) Assignee: Tenable, Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,911

(22) Filed: Sep. 16, 2022

(65) Prior Publication Data

US 2023/0019941 A1    Jan. 19, 2023

Related U.S. Application Data

(63) Continuation of application No. 16/235,082, filed on Dec. 28, 2018, now Pat. No. 11,487,879.

(51) Int. Cl.
*G06F 21/57* (2013.01)
*G06F 8/77* (2018.01)
*G06N 20/00* (2019.01)

(52) U.S. Cl.
CPC ............. *G06F 21/577* (2013.01); *G06F 8/77* (2013.01); *G06N 20/00* (2019.01); *G06F 2221/033* (2013.01)

(58) Field of Classification Search
CPC .......... G06F 21/577; G06F 8/77; G06N 20/00
See application file for complete search history.

(56) References Cited

U.S. PATENT DOCUMENTS

| | | | |
|---|---|---|---|
| 9,516,053 B1* | 12/2016 | Muddu | G06F 3/0484 |
| 10,462,170 B1* | 10/2019 | Wang | H04L 63/1416 |
| 10,764,313 B1* | 9/2020 | Mushtaq | G06N 20/00 |
| 11,487,879 B2* | 11/2022 | Doyle | G06N 20/00 |
| 2013/0097706 A1* | 4/2013 | Titonis | G06F 21/566 726/22 |
| 2018/0077188 A1* | 3/2018 | Mandyam | H04L 67/01 |

* cited by examiner

*Primary Examiner* — Matthew Smithers
*Assistant Examiner* — Shu Chun Gao
(74) *Attorney, Agent, or Firm* — MUNCY, GEISSLER, OLDS & LOWE, P.C.; Daniel Podhajny

(57) ABSTRACT

In an embodiment, a threat score prediction model is generated for assigning a threat score to a software vulnerability. The threat score prediction model may factor one or more of (i) a degree to which the software vulnerability is described across a set of public media sources, (ii) a degree to which one or more exploits that have already been developed for the software vulnerability are described across one or more public exploit databases, (iii) information from one or more third party threat intelligence sources that characterizes one or more historic threat events associated with the software vulnerability, and/or (iv) information that characterizes at least one behavior of an enterprise network in association with the software vulnerability.

39 Claims, 6 Drawing Sheets

THREAT SCORE PREDICTION MODEL

CROSS-REFERENCE TO RELATED APPLICATIONS

The present application for patent claims priority to U.S. Non-Provisional patent application Ser. No. 16/235,082, entitled "THREAT SCORE PREDICTION MODEL," filed Dec. 28, 2018, which is assigned to the assignee hereof and expressly incorporated herein by reference in its entirety.

TECHNICAL FIELD

The various aspects and embodiments described herein generally relate to a threat score prediction model, and more particularly to generation and application of a threat score prediction model.

BACKGROUND

With increasing threats and a constantly changing information technology (IT) landscape, security teams today can barely keep up with the pace of identifying vulnerabilities and threats and, more importantly, fixing them. Furthermore, as more and more organizations embrace virtualization, the cloud, mobile, and collaboration and communication among software development and IT operations (sometimes called "DevOps"), the fundamental concept of an asset changes and radically impacts how and when organizations and security teams need to assess vulnerabilities.

One factor to asset-specific vulnerability assessments is a degree of threat associated with software vulnerabilities. Conventionally, assessing the degree of threat associated with software vulnerabilities is a manual and somewhat subjective process that attempts to rank software vulnerabilities by their associated degree of threat, and then allocate resources to fixing or remediating those software vulnerabilities in accordance with the rankings. More recently, algorithms for automatically predicting exploit development for particular software vulnerabilities have been developed, such as those described in U.S. application Ser. No. 15/827,943, entitled "EXPLOIT PREDICTION BASED ON MACHINE LEARNING". Such algorithms rely upon software vulnerability prevalence (i.e., the raw number of assets impacted by the respective software vulnerabilities) as a primary parameter for exploit development prediction.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

An embodiment is directed to a method of training a model for threat score assessment of software vulnerabilities, comprising obtaining training data associated with a first set of software vulnerabilities, the training data for each software vulnerability among the first set of software vulnerabilities including one or more of (i) a degree to which the software vulnerability is described across a set of public media sources, (ii) a degree to which one or more exploits that have already been developed for the software vulnerability are described across one or more public exploit databases, (iii) information from one or more third party threat intelligence sources that characterizes one or more historic threat events associated with the software vulnerability, and/or (iv) information that characterizes at least one behavior of an enterprise network in association with the software vulnerability, and generating a threat score prediction model based on the training data, wherein the threat score prediction model is configured to determine a threat score for a candidate software vulnerability that is indicative of a likelihood that the candidate software vulnerability will be targeted for exploitation and/or successfully exploited within a target window of time.

Another embodiment is directed to a method for assessing a level of threat associated with a software vulnerability, comprising obtaining a set of vulnerability characteristics for the software vulnerability, each vulnerability characteristic in the set of vulnerability characteristics characterizing one or more of (i) a degree to which the software vulnerability is described across a set of public media sources, or (ii) a degree to which one or more exploits that have already been developed for the software vulnerability are described across one or more public exploit databases, or (iii) information from one or more third party threat intelligence sources that characterizes one or more historic threat events associated with the software vulnerability, and/or (iv) information that characterizes at least one behavior of an enterprise network in association with the software vulnerability, applying the set of vulnerability characteristics as input data to a threat score prediction model, and generating, based on the applying, a threat score for the software vulnerability that is indicative of a likelihood that the software vulnerability will be targeted for exploitation and/or successfully exploited within a target window of time.

Another embodiment is directed to an apparatus configured to train a model for threat score assessment of software vulnerabilities, comprising a memory, and at least one processor coupled to the memory and configured to obtain training data associated with a first set of software vulnerabilities, the training data for each software vulnerability among the first set of software vulnerabilities including one or more of (i) a degree to which the software vulnerability is described across a set of public media sources, (ii) a degree to which one or more exploits that have already been developed for the software vulnerability are described across one or more public exploit databases, (iii) information from one or more third party threat intelligence sources that characterizes one or more historic threat events associated with the software vulnerability, and/or (iv) information that characterizes at least one behavior of an enterprise network in association with the software vulnerability, and generate a threat score prediction model based on the training data, wherein the threat score prediction model is configured to determine a threat score for a candidate software vulnerability that is indicative of a likelihood that the candidate software vulnerability will be targeted for exploitation and/ or successfully exploited within a target window of time.

Another embodiment is directed to an apparatus configured to assess a level of threat associated with a software vulnerability, comprising a memory, and at least one processor coupled to the memory and configured to obtaining a set of vulnerability characteristics for the software vulnerability, each vulnerability characteristic in the set of vulnerability characteristics characterizing one or more of (i) a degree to which the software vulnerability is described across a set of public media sources, or (ii) a degree to which one or more exploits that have already been developed for the software vulnerability are described across one or more public exploit databases, or (iii) information from one or more third party threat intelligence sources that characterizes one or more historic threat events associated with the software vulnerability, and/or (iv) information that characterizes at least one behavior of an enterprise network in association with the software vulnerability, apply the set of vulnerability characteristics as input data to a threat score prediction model, and generate, based on the applying, a threat score for the software vulnerability that is indicative of a likelihood that the software vulnerability will be targeted for exploitation and/or successfully exploited within a target window of time.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
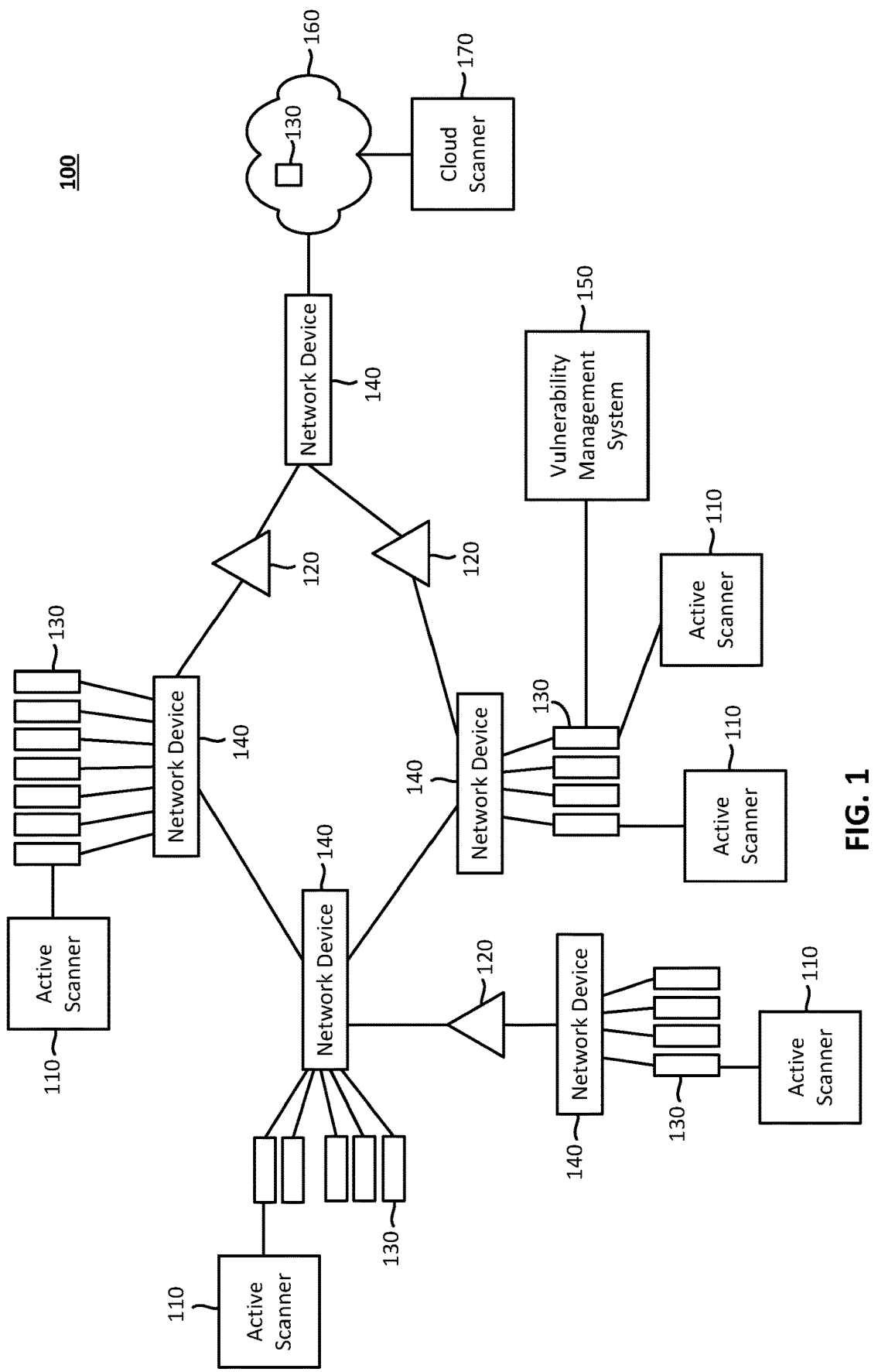
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
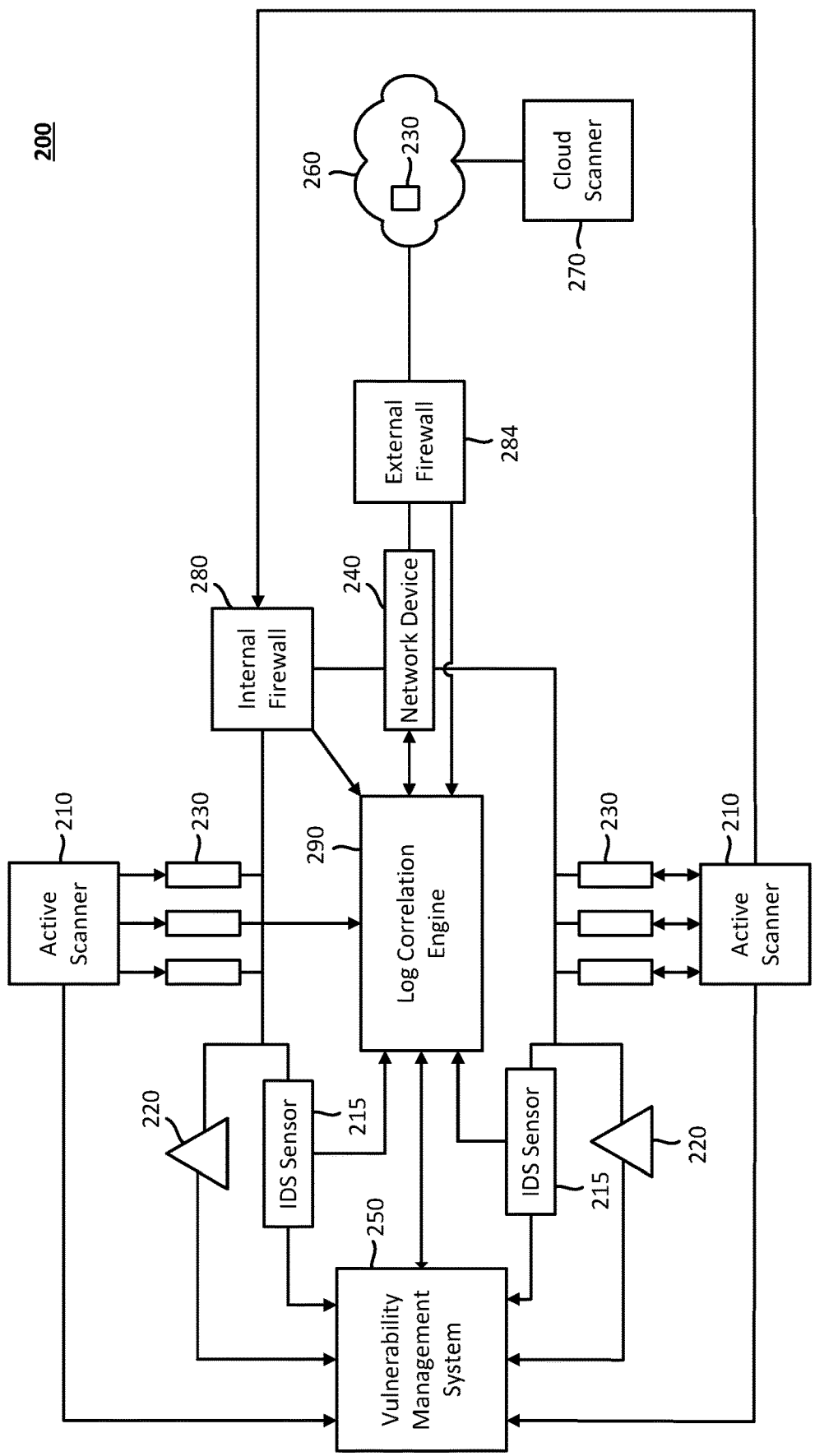
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Figure 3:
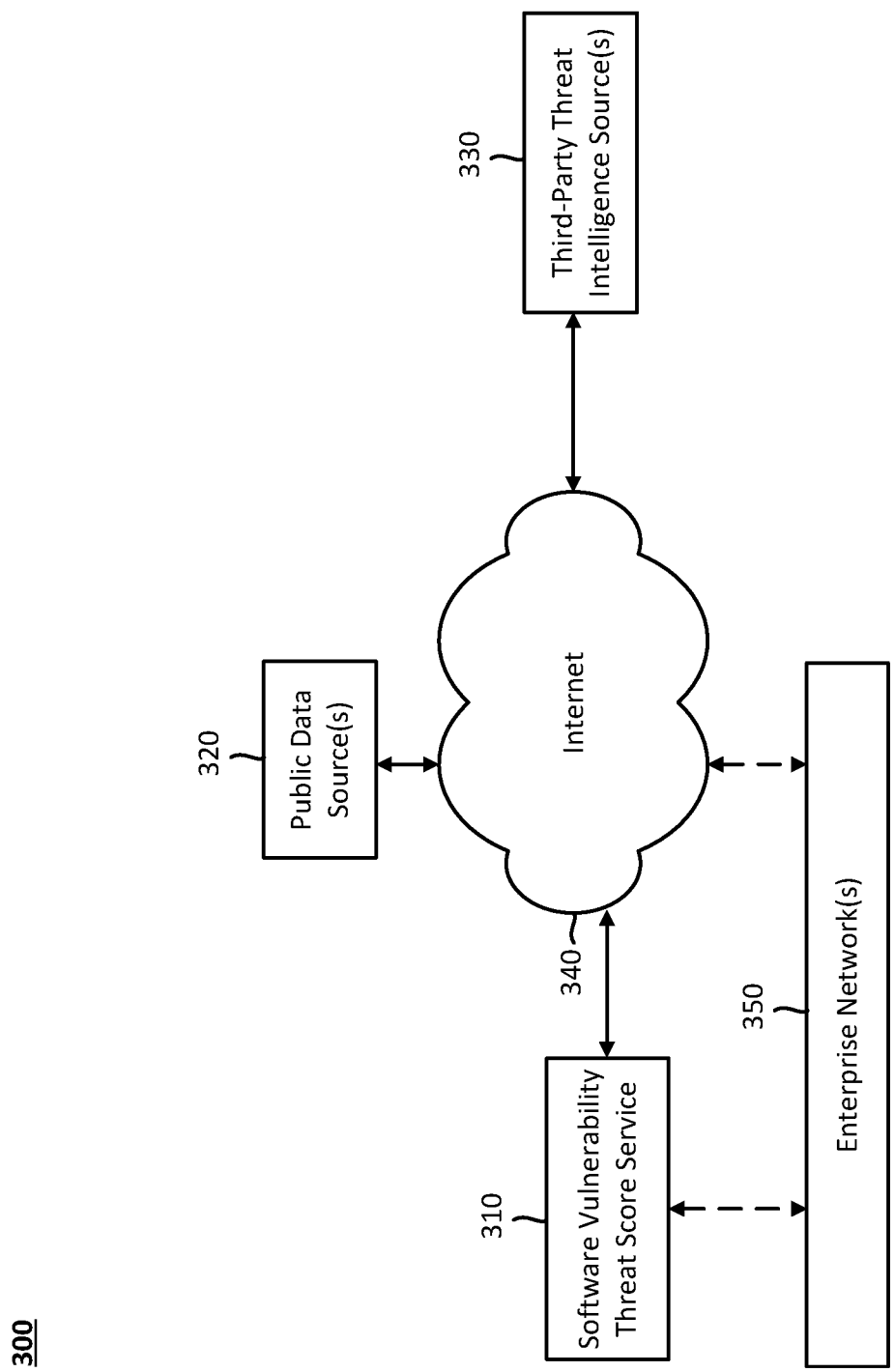
FIG. 3 illustrates an exemplary service level architecture suitable, according to various aspects.

According to various aspects, FIG. 3 illustrates a service level architecture (SLA) 300 suitable for automatically assigning threat scores to one or more identified software vulnerabilities. In particular, as shown in FIG. 3, the SLA 300 may include a software vulnerability threat score service 310, which may be configured to assign threat scores to one or more identified software vulnerabilities based on a threat score algorithm (or model) that will be described in further detail below with respect to FIGS. 4-5. In an example, the software vulnerability threat score service 310 may be executed via one or more servers that are part of a vulnerability management system, such as the vulnerability management system 150 of FIG. 1 or the vulnerability management system 250 of FIG. 2. The software vulnerability threat score service 310 is communicatively coupled to a set of public data sources 320 and a set of third-party threat intelligence sources 330 via an Internet 340. The software vulnerability threat score service 310 is further communicatively coupled to a set of enterprise networks via a direct or private connection, via the Internet 340, or a combination thereof.

As will be described in more detail below, in an example, the set of public data sources 320 may include one or more of a Common Vulnerability Scoring System (CVSS) database, one or more media sources (e.g., one or more mainstream news media sources such as the Associated Press, CNN, etc., one or more web forums such as Reddit, etc., one or more technical publications (e.g., Adobe Security Bulletins and Advisories, Sophos Virus and Spyware Threats, Apple Security Updates, etc.), one or more so-called 'dark' web sources, etc.), one or more public exploit databases (e.g., exploit-db, METASPLOIT, etc.), one or more social media sources (e.g., Facebook, Instagram, Twitter, etc.), or any combination thereof. In a further example, the set of third-party threat intelligence sources 330 may include one or more threat intelligence feeds (e.g., Recorded Future, ReversingLabs, Symantec, FireEye, etc.). In a further example, the set of enterprise networks 350 may be customers of an entity providing vulnerability assistance via the software vulnerability threat score service 310, with the set of enterprise networks 350 providing various customer (or network)-specific behavioral feedback in relation to one or more software vulnerabilities detected on one or more assets of the respective enterprise network(s).

Figure 4:
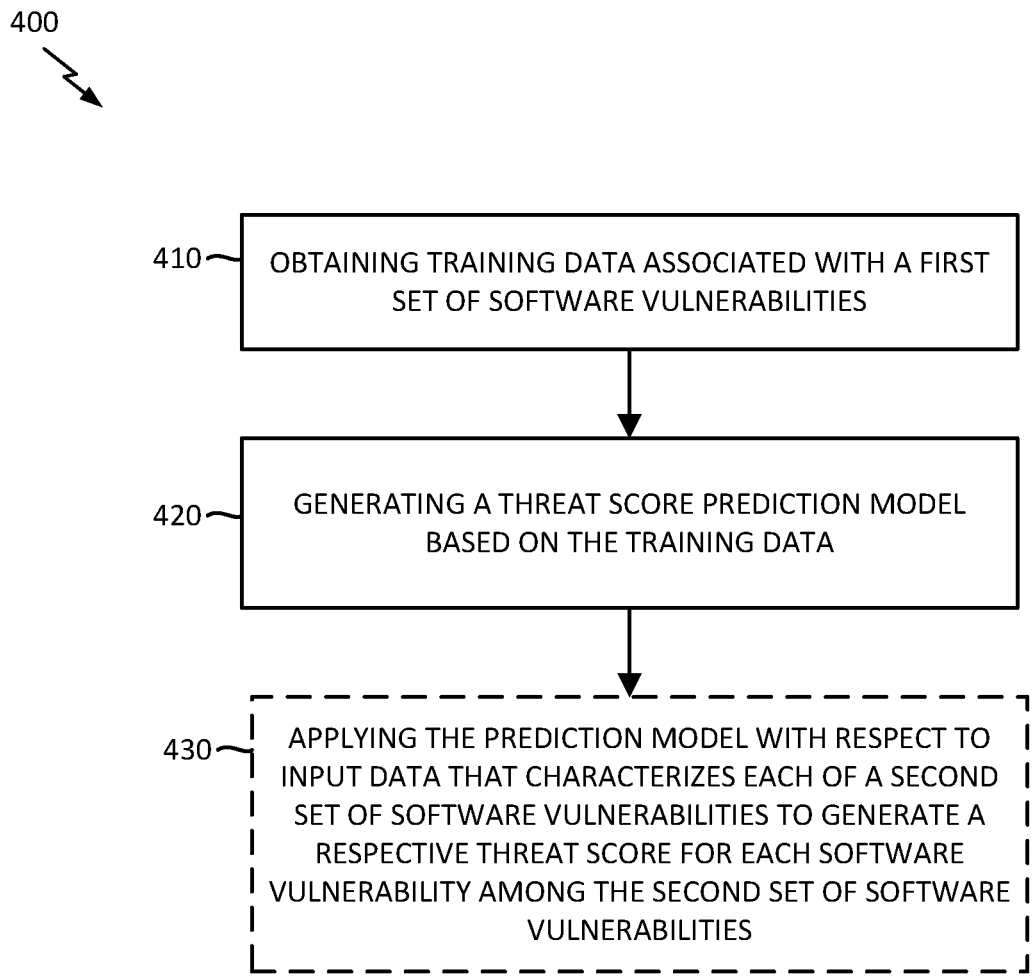
FIG. 4 illustrates an exemplary process for generating a threat score prediction model in accordance with an embodiment of the disclosure.

FIG. 4 illustrates an exemplary process 400 for generating a threat score prediction model in accordance with an embodiment of the disclosure. In an example, the process 400 of FIG. 4 may be performed by the software vulnerability threat score service 310 in an example, which may optionally be integrated as part of a vulnerability management system, such as the vulnerability management system 150 of FIG. 1.

In an example, the process 400 shown in FIG. 4 may generally be performed as an ongoing background process by the software vulnerability threat score service 310, which may also use a current or up-to-date version of the threat score prediction model (e.g., which changes over time) to assign threat scores to software vulnerabilities (e.g., discussed in more detail with respect to FIG. 5 below). Hence, in some cases, the process 400 of FIG. 4 is continual or iterative, whereby the threat score prediction model may change over time as new vulnerability-related data is obtained.

Referring to FIG. 4, at 410, the software vulnerability threat score service 310 training data associated with a first set of software vulnerabilities. In particular, the training data for each software vulnerability among the first set of software vulnerabilities including (in any combination) one or more of:

a degree to which the software vulnerability is described across a set of public media sources, or a degree to which one or more exploits that have already been developed for the software vulnerability are described across one or more public exploit databases, or information from one or more third party threat intelligence sources that characterizes one or more historic threat events associated with the software vulnerability, or information that characterizes at least one behavior of an enterprise network in association with the software vulnerability.

Referring to FIG. 4, at 420, the software vulnerability threat score service 310 generates a threat score prediction model based on the training data. At a high-level, the threat score prediction model represents an estimate of the relationship between the input features of the training data and a target feature. In this case, the target feature is a threat score. More particularly, as will be described in more detail below, the threat score prediction model is configured to determine a threat score for a candidate software vulnerability that is indicative of a likelihood that the candidate software vulnerability will be targeted for exploitation and/or successfully exploited within a target window of time.

In an example, the threat score prediction model may be generated at 420 at least in part by machine learning. Machine learning is a subfield of computer science that evolved from the study of pattern recognition and computation learning theory in artificial intelligence. Machine learning explores the study and construction of algorithms that can learn from and make predictions based on data. Such algorithms operate by building a model from an example training set of input observations in order to make data-driven predictions or decisions expressed as outputs, rather than following strictly static program instructions. Machine learning is employed in a range of computing tasks where designing and programming explicit algorithms is infeasible. Example applications include spam filtering, optical character recognition (OCR), search engines, and computer vision. Within the field of data analytics, machine learning is a methodology used to devise complex models and algorithms that lend themselves to prediction. These analytical models allow researchers, data scientists, engineers, and analysts to produce reliable, repeatable decisions and results as well as to uncover hidden insights through learning from historical relationships and trends in the data. Any machine learning technique may be used to generate the one or more prediction models. Examples of machine learning algorithms include random forest, decision tree learning, association rule learning, artificial neural network, support vector machines, and/or Bayesian networks. Embodiments are not limited to any particular type of machine learning technique or algorithm.

Referring to FIG. 4, at 430, the software vulnerability threat score service 310 optionally applies the threat score prediction model with respect to input data for each of a second set of software vulnerabilities to generate a respective threat score for each software vulnerability among the second set of software vulnerabilities. In an example, the threat score generated by the threat score prediction model may reflect the likelihood of each respective software vulnerability being is targeted for exploitation (e.g., an actual attack attempt or weaponization attempt, which could be successful or unsuccessful) and/or successfully exploited (e.g., an attack attempt or weaponization attempt that succeeds in exploiting the software vulnerability) within a target window of time (e.g., within the next week, the next month, etc.). In one example, the threat score may factor a remediation timing estimate for a respective software vulnerability (e.g., if the remediation timing estimate is sooner than an estimated exploit attempt time, than an unsuccessful exploitation attempt within the target window of time is predicted which may be reflected in the threat score, while if the remediation timing estimate is later than an estimated exploit attempt time, than a successful exploitation attempt within the target window of time is predicted). Generally, lower threat scores are used to convey a low likelihood of any exploit attempt of a respective software vulnerability, intermediate threat scores are used to convey a high likelihood of an unsuccessful exploit attempt, and higher threat scores are used to convey a high likelihood of a successful exploit attempt. In an example, 430 is optional because the software vulnerability threat score service 310 that generates the threat score prediction model may be independent of a separate score prediction model that applies the threat score prediction model to general actual threat scores. However, in some implementations, the software vulnerability threat score service 310 may be responsible both for generating (and updating) the threat score prediction model as well as applying the threat score prediction model to general actual threat scores. Moreover, in an example, the input data for generation of the threat score(s) may also be used as training data for updating the threat score prediction model itself.

Referring to FIG. 4, as noted above with respect to 420, the training data used to generate the threat score prediction model may include a degree to which the software vulnerability is described across a set of public media sources. Examples of this category of training data for a particular software vulnerability may include one or more features derived from one or more natural language descriptions obtained from one or more public media sources about a software vulnerability (e.g., number of words in a vulnerability description, one or more N-gram features derived from one or more public media sources (whereby N may span from 1 up to some threshold integer value), such as a Term Frequency Inverse Document Frequency (TF-IDF) computed based on the vulnerability description, etc.). In an example, the vulnerability description word count may be obtained from a CVSS database. In an example, a higher word count may be weighted more (e.g., as a contributor to higher threat score assessments) than shorter word counts (e.g., because higher word counts may indicate more interest, attention and/or knowledge regarding that software vulnerability). Another example of this category of training data may include a prevalence of references to the software vulnerability (e.g., a number of mentions, a number of forum threads referencing the software vulnerability in a thread title, etc.) across public media sources such as mainstream news media, web forums, technical publications, the so-called 'dark' web, etc. In an example, the media source type may be used to weight the impact of the associated software vulnerability reference in the threat score prediction model. For example, a reference to the software vulnerability in mainstream news media may be expected to reach a wider audience then a reference to the software vulnerability in an anonymous dark web message, such that software vulnerability references in mainstream news media may be weighted more (e.g., as a contributor to higher threat score assessments) than anonymous dark web message references. In another example, a degree of prominence associated within a particular reference to the software vulnerability may be factored into the threat score prediction model. For example, a reference to the software vulnerability in a title of a forum thread may be weighted more (e.g., as a contributor to higher threat score assessments) than individual forum entries inside that forum thread (e.g., because the forum thread title may infer that all forum entries inside that thread are related to the software vulnerability, and hence has more prominence than any individual forum entry inside that thread). In another example, a reference to the software vulnerability in particular dark web forums or messaging may be weighted more (e.g., as a contributor to higher threat score assessments) than other media sources (e.g., because a relatively high number of potential threat actors may be expected to use dark web forums or messaging for their communications).

Referring to FIG. 4, as noted above with respect to 420, the training data used to generate the threat score prediction model may include a degree to which one or more exploits that have already been developed for the software vulnerability are described across one or more public exploit databases (e.g., exploit-db, METASPLOIT, etc.). Examples of this category of training data for a particular software vulnerability may include a count of the number of entries related to a software vulnerability on the one or more public exploit databases (e.g., exploit-db, METASPLOIT, etc.).

Referring to FIG. 4, as noted above with respect to 420, the training data used to generate the threat score prediction model may include information from one or more third party threat intelligence sources that characterizes one or more historic threat events associated with the software vulnerability. In an example, the classification of a 'threat event' may be defined by the third party threat intelligence source from which the data is received, and can potentially vary somewhat between third party threat intelligence sources. Generally, a threat event refers to an attempt (e.g., which may either be successful or unsuccessful) by a threat actor to exploit a known software vulnerability in a manner that has the potential to result in loss. In a further example, the information from the third party threat intelligence source(s) (e.g., Recorded Future, etc.) may include data for different time windows (e.g., the previous 28 days, since the software vulnerability was first published, etc.). In an example, relative to the particular time window, the data may specify a total number of threat events related to the software vulnerability (e.g., for particular third party threat intelligence sources), a language of the threat event (e.g., English, Portuguese, Russian, Chinese, Korean, etc.), a media type of the threat event (e.g., social media, mainstream news, underground forums, security blogs, dark web, code repositories, security vendor reporting, etc.), a topic of the threat event (e.g., information security, technology, cyber, etc.), the number of days since the first threat event, the number of days since the most recent threat event, the number of distinct days with at least one threat event, and so on.

Referring to FIG. 4, as noted above with respect to 420, the training data used to generate the threat score prediction model may include information that characterizes at least one behavior of an enterprise network in association with the software vulnerability. One example of this category of training data for a particular software vulnerability may include information that characterizes historic customer-specific (or network-specific) remediation metrics of the software vulnerability, including but not limited to average time to remediate a particular software vulnerability in a particular network (e.g., based on customer (or network) scan results). Another example of this category of training data for a particular software vulnerability may include information that characterizes a degree to which one or more customers (or network operators) perceive a particular software vulnerability as a threat. In an example, the customer-specific threat perception level can be indicated via a 'recast' score, which is a customer-defined threat score that functions to override (or replace) a threat score generated in accordance with the threat score prediction model (more precisely, with a previous version of the threat score prediction model that is then updated or refined based on the recast score feedback). So, customer feedback that essentially overrides a threat score calculation can be used to refine the threat score prediction model for future threat score calculations. Moreover, in a further example, the recast scores from different customers can be applied to the threat score prediction model by factoring any of the following inter-customer recast metrics:

- An average recast score for the software vulnerability from among a plurality of recast scores provided from a plurality of customers (or networks), or
- A maximum recast score for the software vulnerability from among a plurality of recast scores provided from a plurality of customers (or networks), or
- A minimum recast score for the software vulnerability from among a plurality of recast scores provided from a plurality of customers (or networks), or
- A total recast score count that indicates a number of times a threat score for the software vulnerability has been recast across a plurality of customers (or networks), or
- A number of days since a threat score for the software vulnerability has been recast by any customer.

In addition to the training data (or vulnerability characteristics) described with respect to 420 of FIG. 4, various 'secondary' vulnerability characteristics may also be factored into the threat score prediction model. By way of example, these secondary vulnerability characteristics (or secondary training data) may include any of the following:

- A degree of difficulty or complexity associated with exploit development for the software vulnerability, which may include CVSS v2 data (e.g., attack vector, attack complexity, base score), CVSS v3 data (e.g., confidentiality impact, exploitability score, etc.), a CVSS score or list of weakness types,
- An age of the software vulnerability (e.g., the number of days since publication of the software vulnerability on the US National Vulnerability Database, etc.),
- An age of a developed exploit for the software vulnerability (e.g., obtained from one or more public exploit databases), the number of days since the first exploit entry on a public exploit database (e.g., exploit-db, METASPLOIT, etc.), the number of days since the last exploit entry on a public exploit database (e.g., exploit-db, METASPLOIT, etc.), etc.,
- Information characterizing a set of software version and/or vendors that are exposed to the software vulnerability (e.g., a list or number of impacted software versions, such as OS-types, a list or number of impacted vendors, etc.), A prevalence of the software vulnerability (e.g., a total number of impacted assets, either globally or within particular Intranets or enterprise networks, etc.)

Figure 5:
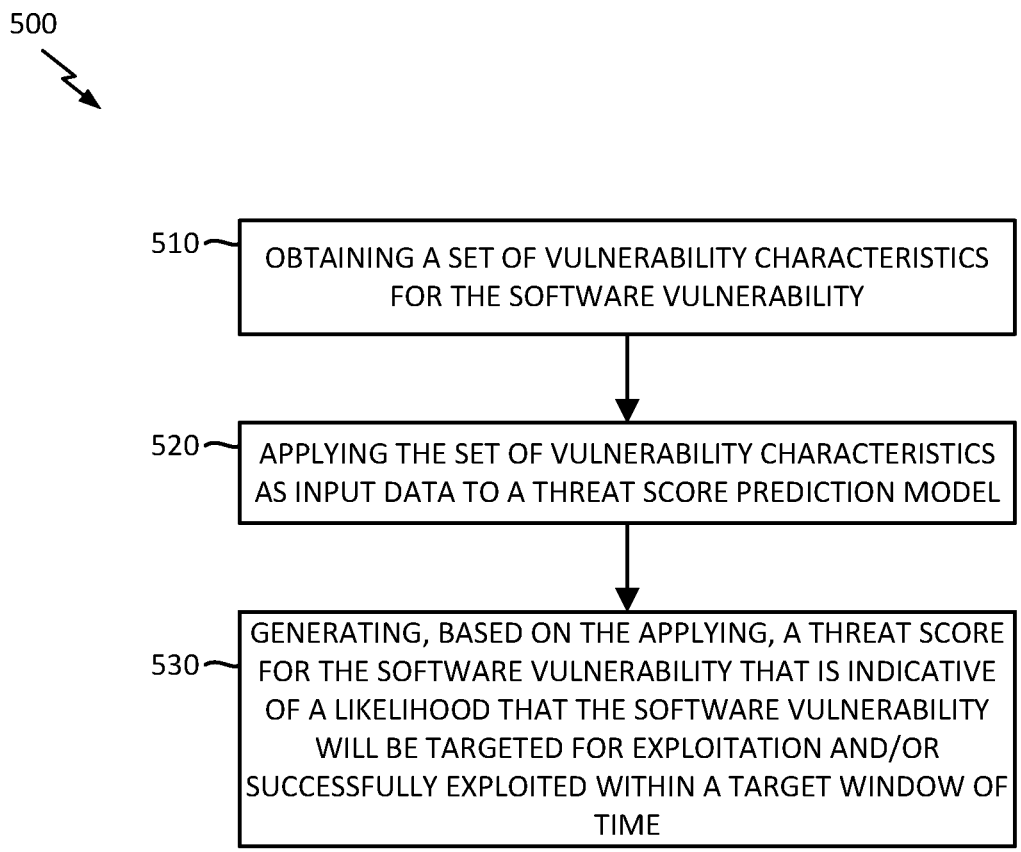
FIG. 5 illustrates an exemplary process for assessing a level of threat associated with a software vulnerability in accordance with an embodiment of the disclosure.

FIG. 5 illustrates an exemplary process 500 for assessing a level of threat associated with a software vulnerability in accordance with an embodiment of the disclosure. In an example, the process 500 of FIG. 5 may be performed by the software vulnerability threat score service 310 in an example, which may optionally be integrated as part of a vulnerability management system, such as the vulnerability management system 150 of FIG. 1. As noted above, the software vulnerability threat score service 310 that generates the threat score prediction model in accordance with process 400 of FIG. 4 may be the same or different from the software vulnerability threat score service 310 that applies (or executes) the software vulnerability threat score service 310 in accordance with process 500 of FIG. 5. In an example, the entirety of the process 500 of FIG. 5 corresponds to an example implementation of optional 430 from FIG. 4.

Referring to FIG. 5, at 510, the software vulnerability threat score service 310 obtains a set of vulnerability characteristics for the software vulnerability. At 520, the software vulnerability threat score service 310 applies the set of vulnerability characteristics as input data to a threat score prediction model. At 530, based on (e.g., as an output of) the applying from 520, the software vulnerability threat score service 310 generates a threat score for the software vulnerability that is indicative of a likelihood that the software vulnerability will be targeted for exploitation (e.g., an actual attack attempt or weaponization attempt, which could be successful or unsuccessful) and/or successfully exploited (e.g., an attack attempt or weaponization attempt that succeeds in exploiting the software vulnerability) within a target window of time. As noted above with respect to FIG. 4, in one example, the threat score may factor a remediation timing estimate for a respective software vulnerability (e.g., if the remediation timing estimate is sooner than an estimated exploit attempt time, than an unsuccessful exploitation attempt within the target window of time is predicted which may be reflected in the threat score, while if the remediation timing estimate is later than an estimated exploit attempt time, than a successful exploitation attempt within the target window of time is predicted). Generally, lower threat scores are used to convey a low likelihood of any exploit attempt of a respective software vulnerability, intermediate threat scores are used to convey a high likelihood of an unsuccessful exploit attempt, and higher threat scores are used to convey a high likelihood of a successful exploit attempt Referring to FIG. 5, the set of vulnerability characteristics obtained at 510 and applied as input data at 520 may include some or all of the same data types that are used to train the threat score prediction model as described above with respect to FIG. 4. Hence, in an example, the set of vulnerability characteristics obtained at 510 and applied as input data at 520 may include any combination of (i) a degree to which the software vulnerability is described across a set of public media sources, (ii) a degree to which one or more exploits that have already been developed for the software vulnerability are described across one or more public exploit databases, (iii) information from one or more third party threat intelligence sources that characterizes one or more historic threat events associated with the software vulnerability, and/or (iv) information that characterizes at least one behavior of an enterprise network in association with the software vulnerability. The set of vulnerability characteristics may further optionally include 'secondary' data types as well, which may correspond to any combination of the above-noted data types described with respect to the secondary training data in an example. As will be appreciated, while possible, the set of vulnerability characteristics obtained at 510 and applied as input data at 520 need not map precisely to those same data types used as part of the training data for the threat score prediction model. However, there will generally be at least some overlap between the data types (or features) with the training data so that at least some of the knowledge (or threat score inferences) gleaned from the training data can be applied to the newly obtained set of vulnerability statistics obtained at 510. The specific examples of vulnerability characteristic types (i) through (iv) as well as the secondary data types are omitted here for the sake of brevity, as such examples have already been provided with respect to FIG. 4.

In an example, the threat score for each software vulnerability may fall in the range of [0.0 . . . 1.0], whereby a threat score of 0.0 represents essentially no threat (e.g., near 0% chance that a respective software vulnerability will be successfully exploited and/or targeted for exploitation within a target window of time) and a threat score of 1.0 represents a high likelihood of threat (e.g., near 100% chance that a respective software vulnerability will be successfully exploited within a target window of time). Table 1 (below) depicts an ordered (or ranked) list of software vulnerabilities and associated threat scores in accordance with one example:

TABLE 1

| Vulnerability Name | Threat Score |
|---|---|
| CVE-ABC-1234 | 0.98 |
| CVE-ABC-5678 | 0.97 |
| . . . | . . . |
| CVE-XYZ-1234 | 0.0 |

In a further example, the threat score may be modified (i.e., scaled, such as by multiplying by 4 and rounding to the nearest tenths as shown in Table 2 below) to generate a modified vulnerability score in the range of [0.0 . . . 4.0]. For example, the scaling (or modifying) of the threat score can be implemented so that the modified (or scaled) threat score can be added to the CVSS v3 Impact Score with a target weighting. Hence, in the example shown in Table 2, the vulnerability score reflects a weighting of 40% attributable to the (modified) threat score, with 60% attributable to the CVSS v3 Impact Score. Of course, other weightings are possible in other embodiments. In particular, the modified vulnerability score can then be combined (e.g., added to) a CVSS v3 impact score in the range of [0.0 . . . 6.0] to produce a vulnerability score in the range of [0.0 . . . 10.0], as shown in Table 2 as follows:

TABLE 2

| Vulnerability Name | Threat Score | Modified Threat Score | CVSS v3 Impact Score | Vulnerability Score |
|---|---|---|---|---|
| CVE-ABC-1234 | 0.98 | 3.9 | 5.9 | 9.8 |
| CVE-ABC-5678 | 0.97 | 3.9 | 5.7 | 9.6 |
| . . . | . . . | . . . | . . . | . . . |
| CVE-XYZ-1234 | 0.0 | 0.0 | 4.1 | 4.1 |

Figure 6:
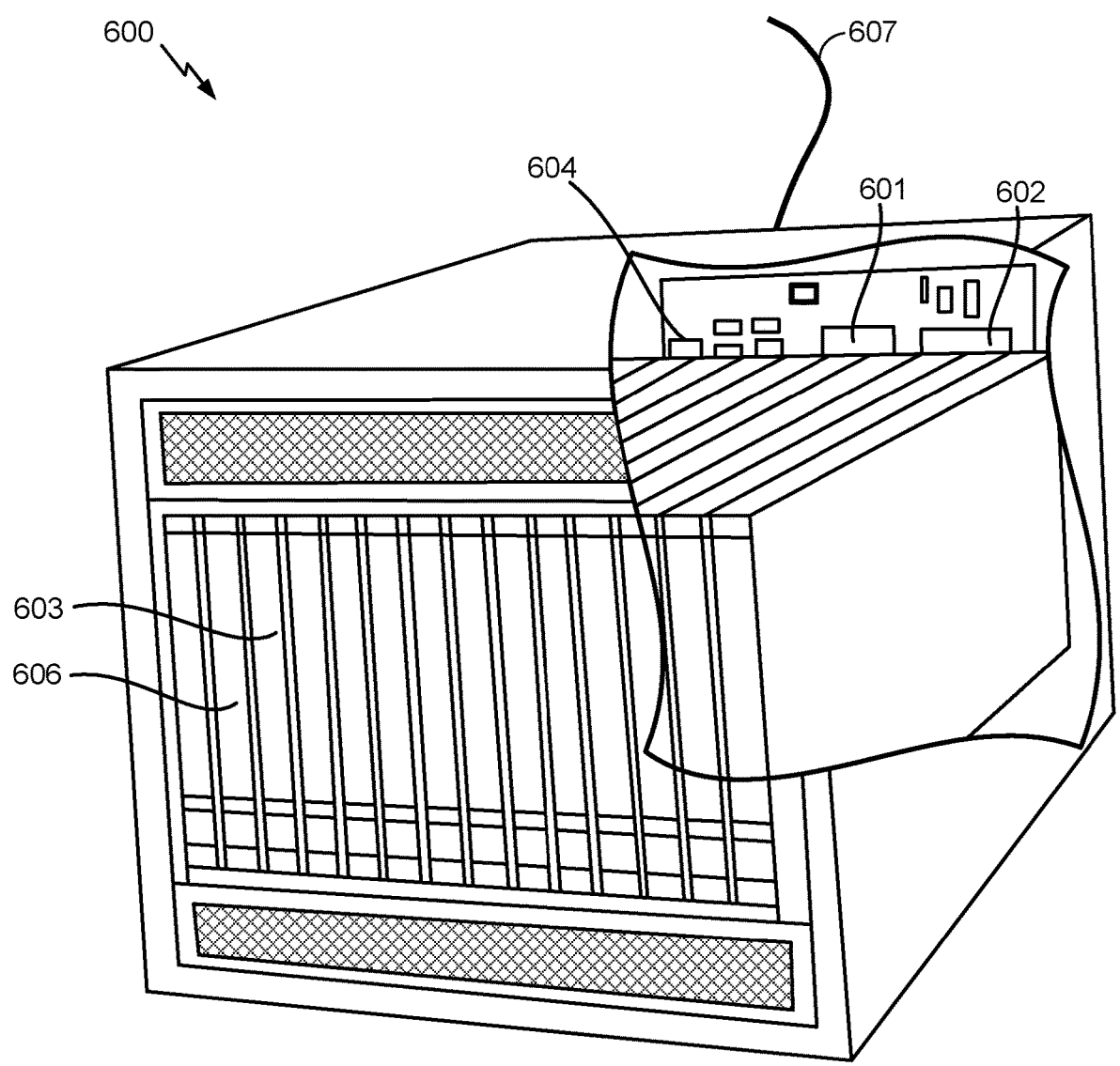
FIG. 6 illustrates a server in accordance with an embodiment of the disclosure.

The various embodiments may be implemented on any of a variety of commercially available server devices, such as server 600 illustrated in FIG. 6. In an example, the server 600 may correspond to one example configuration of a server on which the software vulnerability threat score service 310 may execute, which in certain implementations may be included as part of the vulnerability management system 150 of FIG. 1 or the vulnerability management system 250 of FIG. 2. In FIG. 6, the server 600 includes a processor 601 coupled to volatile memory 602 and a large capacity nonvolatile memory, such as a disk drive 603. The server 600 may also include a floppy disc drive, compact disc (CD) or DVD disc drive 606 coupled to the processor 601. The server 600 may also include network access ports 604 coupled to the processor 601 for establishing data connections with a network 607, such as a local area network coupled to other broadcast system computers and servers or to the Internet.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of training a model for threat score assessment of software vulnerabilities, comprising:
    obtaining training data associated with a first set of software vulnerabilities, the training data for each software vulnerability among the first set of software vulnerabilities including one or more of:
        a degree to which one or more exploits that have already been developed for the software vulnerability are described across one or more public exploit databases, information from one or more third party threat intelligence sources that characterizes one or more historic threat events associated with the software vulnerability, or a combination thereof; and generating a threat score prediction model based on the training data, wherein the threat score prediction model is configured to determine a threat score for a candidate software vulnerability that is indicative of a likelihood that the candidate software vulnerability will be targeted for exploitation, or successfully exploited within a target window of time, or both.

2. The method of claim 1, wherein the training data further includes a degree to which the software vulnerability is described across a set of public media sources.

3. The method of claim 2, wherein the set of public media sources includes one or more mainstream news media sources, one or more web forums, one or more technical publications, one or more dark web sources, one or more social media sources, or any combination thereof.

4. The method of claim 2, wherein the training data includes one or more features derived from one or more natural language descriptions of the software vulnerability in a given public media source.

5. The method of claim 2, wherein the training data includes a prevalence of references to the software vulnerability across the one or more public media sources.

6. The method of claim 5, wherein the threat score prediction model assigns weights to one or more of the references based on a media source type, a degree of prominence of the associated references, or both.

7. The method of claim 1, wherein the training data includes the degree to which one or more exploits that have already been developed for the software vulnerability are described across the one or more public exploit databases.

8. The method of claim 7, wherein the training data includes a count of a number of entries related to the software vulnerability on the one or more public exploit databases.

9. The method of claim 1, wherein the training data includes the information from the one or more third party threat intelligence sources that characterizes the one or more historic threat events associated with the software vulnerability.

10. The method of claim 9, wherein the training data includes, for a particular window of time, a total number of threat events related to the software vulnerability, a language, media type associated with one or more threat events, topic associated with the one or more threat events, a number of days since a first threat event, a number of days since a most recent threat event, a number of days having at least one threat event, or any combination thereof.

11. The method of claim 1, wherein the training data further includes information that characterizes at least one behavior of an enterprise network in association with the software vulnerability.

12. The method of claim 11, wherein the training data includes information that characterizes one or more historic remediation metrics of the software vulnerability.

13. The method of claim 12, wherein the one or more historic remediation metrics include an average time to remediate the software vulnerability in a particular network.

14. The method of claim 11, wherein the training data includes a degree to which one or more customers perceive the software vulnerability as a threat.

15. The method of claim 14, wherein the degree to which the one or more customers perceive the software vulnerability as a threat is indicated via a recast score that overrides a threat score generated by a previous version of the threat score prediction model.

16. The method of claim 15, wherein the training data includes inter-customer recast metrics.

17. The method of claim 16, wherein the inter-customer recast metrics include:

an average recast score for the software vulnerability from among a plurality of recast scores provided from a plurality of customers, a maximum recast score for the software vulnerability from among the plurality of recast scores, a minimum recast score for the software vulnerability from among the plurality of recast scores, a total recast score count that indicates a number of time a threat score for the software vulnerability has been recast, a number of days since a threat score for the software vulnerability has been recast by any customer, or any combination thereof.

18. The method of claim 1, further comprising:

obtaining secondary training data associated with the first set of software vulnerabilities, the secondary training data for each software vulnerability among the first set of software vulnerabilities including one or more of:

a degree of difficulty or complexity associated with exploit development for the software vulnerability, an age of the software vulnerability, an age of a developed exploit for the software vulnerability, information characterizing a set of software version exposed to the software vulnerability, information characterizing a set of vendors that are exposed to the software vulnerability, or a prevalence of the software vulnerability, wherein the generating is further based upon the secondary training data.

19. The method of claim 1, further comprising:

applying the threat score prediction model with respect to input data for each of a second set of software vulnerabilities to generate a respective threat score for each software vulnerability among the second set of software vulnerabilities.

20. A method for assessing a level of threat associated with a software vulnerability, comprising:

obtaining a set of vulnerability characteristics for the software vulnerability, each vulnerability characteristic in the set of vulnerability characteristics characterizing one or more of:

a degree to which one or more exploits that have already been developed for the software vulnerability are described across one or more public exploit databases, or information from one or more third party threat intelligence sources that characterizes one or more historic threat events associated with the software vulnerability, or a combination thereof; applying the set of vulnerability characteristics as input data to a threat score prediction model; and generating, based on the applying, a threat score for the software vulnerability that is indicative of a likelihood that the software vulnerability will be targeted for exploitation, or successfully exploited within a target window of time, or both.

21. The method of claim 20, wherein at least one vulnerability characteristic in the set of vulnerability characteristics further characterizes a degree to which the software vulnerability is described across a set of public media sources.

22. The method of claim 21, wherein the set of public media sources includes one or more mainstream news media sources, one or more web forums, one or more technical publications, one or more dark web sources, one or more social media sources, or any combination thereof.

23. The method of claim 21, wherein the at least one vulnerability characteristic characterizes one or more features derived from one or more natural language descriptions of the software vulnerability in a given public media source.

24. The method of claim 21, wherein the at least one vulnerability characteristic characterizes a prevalence of references to the software vulnerability across the one or more public media sources.

25. The method of claim 24, wherein the threat score prediction model assigns weights to one or more of the references based on a media source type, or a degree of prominence of the associated references, or both.

26. The method of claim 20, wherein at least one vulnerability characteristic in the set of vulnerability characteristics characterizes the degree to which one or more exploits that have already been developed for the software vulnerability are described across the one or more public exploit databases.

27. The method of claim 26, wherein the at least one vulnerability characteristic characterizes a count of a number of entries related to the software vulnerability on the one or more public exploit databases.

28. The method of claim 20, wherein at least one vulnerability characteristic in the set of vulnerability characteristics characterizes the information from the one or more third party threat intelligence sources that characterizes the one or more historic threat events associated with the software vulnerability.

29. The method of claim 28, wherein the at least one vulnerability characteristic characterizes, for a particular window of time, a total number of threat events related to the software vulnerability, a language, media type associated with one or more threat events, topic associated with the one or more threat events, a number of days since a first threat event, a number of days since a most recent threat event, a number of days having at least one threat event, or any combination thereof.

30. The method of claim 20, wherein at least one vulnerability characteristic in the set of vulnerability characteristics further includes information that characterizes at least one behavior of an enterprise network in association with the software vulnerability.

31. The method of claim 30, wherein the at least one vulnerability characteristic includes information that characterizes one or more historic remediation metrics of the software vulnerability.

32. The method of claim 31, wherein the one or more historic remediation metrics include an average time to remediate the software vulnerability in a particular network.

33. The method of claim 30, wherein the at least one vulnerability characteristic characterizes a degree to which one or more customers perceive the software vulnerability as a threat.

34. The method of claim 33, wherein the degree to which the one or more customers perceive the software vulnerability as a threat is indicated via a recast score that overrides a threat score generated by a previous version of the threat score prediction model.

35. The method of claim 34, wherein the at least one vulnerability characteristic characterizes inter-customer recast metrics.

36. The method of claim 35, wherein the inter-customer recast metrics include:
 an average recast score for the software vulnerability from among a plurality of recast scores provided from a plurality of customers,
 a maximum recast score for the software vulnerability from among the plurality of recast scores,
 a minimum recast score for the software vulnerability from among the plurality of recast scores,
 a total recast score count that indicates a number of time a threat score for the software vulnerability has been recast,
 a number of days since a threat score for the software vulnerability has been recast by any customer, or
 any combination thereof.

37. The method of claim 20, further comprising:
 obtaining a second set of vulnerability characteristics for the software vulnerability, each vulnerability characteristic in the second set of vulnerability characteristics characterizing one or more of:
 a degree of difficulty or complexity associated with exploit development for the software vulnerability,
 an age of the software vulnerability,
 an age of a developed exploit for the software vulnerability,
 information characterizing a set of software version exposed to the software vulnerability, or
 information characterizing a set of vendors that are exposed to the software vulnerability, or
 a prevalence of the software vulnerability,
 wherein the generating is further based upon the second set of vulnerability characteristics.

38. An apparatus configured to train a model for threat score assessment of software vulnerabilities, comprising:
 a memory; and
 at least one processor coupled to the memory and configured to:
 obtain training data associated with a first set of software vulnerabilities, the training data for each software vulnerability among the first set of software vulnerabilities including one or more of:
 a degree to which one or more exploits that have already been developed for the software vulnerability are described across one or more public exploit databases, or
 information from one or more third party threat intelligence sources that characterizes one or more historic threat events associated with the software vulnerability, or
 a combination thereof; and
 generate a threat score prediction model based on the training data,
 wherein the threat score prediction model is configured to determine a threat score for a candidate software vulnerability that is indicative of a likelihood that the candidate software vulnerability will be targeted for exploitation, or successfully exploited within a target window of time, or both.

39. An apparatus configured to assess a level of threat associated with a software vulnerability, comprising:
 a memory; and at least one processor coupled to the memory and configured to:
- obtain a set of vulnerability characteristics for the software vulnerability, each vulnerability characteristic in the set of vulnerability characteristics characterizing one or more of:
  - a degree to which one or more exploits that have already been developed for the software vulnerability are described across one or more public exploit databases, or
  - information from one or more third party threat intelligence sources that characterizes one or more historic threat events associated with the software vulnerability, or
  - a combination thereof;
- apply the set of vulnerability characteristics as input data to a threat score prediction model; and
- generate, based on the applying, a threat score for the software vulnerability that is indicative of a likelihood that the software vulnerability will be targeted for exploitation, or successfully exploited within a target window of time, or both.

\* \* \* \* \*